(12) United States Patent
Tofighbakhsh et al.

(10) Patent No.: US 9,584,382 B2
(45) Date of Patent: Feb. 28, 2017

(54) COLLECTING AND USING QUALITY OF EXPERIENCE INFORMATION

(71) Applicants: AT&T Intellectual Property I, L.P., Atlanta, GA (US); AT&T Mobility II LLC, Atlanta, GA (US)

(72) Inventors: Mostafa Tofighbakhsh, Cupertino, CA (US); Michael Q. Iapalucci, Carrollton, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 678 days.

(21) Appl. No.: 13/687,462

(22) Filed: Nov. 28, 2012

(65) Prior Publication Data

US 2014/0149573 A1 May 29, 2014

(51) Int. Cl.
| | |
|---|---|
| G06F 15/16 | (2006.01) |
| H04L 12/26 | (2006.01) |
| H04L 12/66 | (2006.01) |
| H04W 4/02 | (2009.01) |
| H04W 64/00 | (2009.01) |
| H04L 29/08 | (2006.01) |
| H04L 29/06 | (2006.01) |
| H04L 12/24 | (2006.01) |

(52) U.S. Cl.
CPC ............ *H04L 43/045* (2013.01); *H04L 12/66* (2013.01); *H04L 41/22* (2013.01); *H04L 41/5067* (2013.01); *H04L 65/1016* (2013.01); *H04L 65/80* (2013.01); *H04L 67/18* (2013.01); *H04W 4/02* (2013.01); *H04W 64/00* (2013.01); *H04L 41/18* (2013.01); *H04L 43/0817* (2013.01)

(58) Field of Classification Search
CPC .... H04L 41/5067; H04L 12/26; H04L 43/045
USPC .......................... 709/224, 219, 228; 455/420
See application file for complete search history.

(56) References Cited

U.S. PATENT DOCUMENTS

| | | | |
|---|---|---|---|
| 7,706,291 B2 | 4/2010 | Luft et al. | |
| 8,711,705 B1* | 4/2014 | Johnson et al. | ............... 370/241 |
| 9,084,179 B2* | 7/2015 | Visuri | ................... H04W 48/16 |
| 2004/0128071 A1 | 7/2004 | Schradi | |
| 2008/0102809 A1* | 5/2008 | Beyer | ........................... 455/420 |

(Continued)

OTHER PUBLICATIONS

Wu, W. et al., "Quality of Experience in Distributed Interactive Multimedia Environments: Toward a Theoretical Framework," MM'09, Proceedings of the 17th ACM international conference on Multimedia, Oct. 19-24, 2009.

(Continued)

*Primary Examiner* — Khanh Dinh
(74) *Attorney, Agent, or Firm* — Hartman & Citrin LLC

(57) ABSTRACT

Concepts and technologies are disclosed herein for collecting and using quality of experience information. A server computer executing a quality of experience management service can receive a request for quality of experience display data. The server computer can obtain location data defining a geographic location of a user device and analyze quality of experience information defining a quality of experience of an application program associated with the user device. The server computer can generate the quality of experience display data based upon the quality of experience information, and provide the quality of experience display data to the user device.

20 Claims, 12 Drawing Sheets

(56) References Cited

U.S. PATENT DOCUMENTS

| | | |
|---|---|---|
| 2009/0125228 A1* | 5/2009 | Dicke et al. .................. 701/201 |
| 2010/0020717 A1* | 1/2010 | McGregor ........... H04B 17/309 |
| | | 370/252 |
| 2010/0029266 A1 | 2/2010 | Van Gassel et al. |
| 2011/0137561 A1* | 6/2011 | Kankainen ................... 701/300 |
| 2012/0188882 A1 | 7/2012 | Wilkinson et al. |
| 2013/0106989 A1* | 5/2013 | Gage ...................... H04N 7/152 |
| | | 348/14.09 |
| 2013/0227078 A1* | 8/2013 | Wei et al. ..................... 709/219 |

OTHER PUBLICATIONS

Dialogic, "Quality of Experience for Mobile Video Users," 2009.
Coria, Lino E., Di Xu, and Panos Nasiopoulos. "Quality of experience of stereoscopic content on displays of different sizes: A comprehensive subjective evaluation." Consumer Electronics (ICCE), 2011 IEEE International Conference on Consumer Electronics (ICCE). IEEE, 2011.

* cited by examiner

COLLECTING AND USING QUALITY OF EXPERIENCE INFORMATION

BACKGROUND

This application relates generally to quality of experience. More particularly, the disclosure provided herein relates to collecting and using quality of experience information.

Over the past several years, the prevalence of smartphones and other portable Internet-enabled devices has increased rapidly. More recently, users have begun to rely upon smartphones and/or other portable devices such as tablet computers for activities that previously may have been completed with a desktop computer. Unlike a desktop computer having a dedicated Internet connection, portable computing devices such as smartphones may have a connection quality that deviates greatly in response to movements of the portable devices.

For example, a smartphone user may determine that voice quality decreases as the user walks into a restaurant. Similarly, data rates and/or other communication quality metrics may change based upon traffic, location, device characteristics, or the like. In some areas, overlapping cells and/or other interference can result in widely varying connection quality that may be invisible to the user. Thus, a user may attempt a communication multiple times, which may put additional load on the network elements attempting to support the requested communications.

SUMMARY

The present disclosure is directed to collecting and using quality of experience information. A server computer can execute a quality of experience management service configured to provide quality of experience display data to a requestor. In various implementations of the concepts and technologies disclosed herein, the requestor can correspond to a user device. The user device can execute a quality of experience application for collecting and providing device data to the quality of experience management service for use in generating and providing the quality of experience display data. The device data can include quality of experience information describing device and/or network conditions or availability at or near the user device, and location data specifying a geographic location of the user device.

The quality of experience management service can analyze the device data and data stored at a data store. The data stored at the data store can include quality of experience data collected from any number of other devices and/or quality of experience information collected from network devices and/or systems. The quality of experience management service can analyze the data to generate quality of experience display data for presentation at the user device. The quality of experience display data can include data that can be interpreted by the quality of experience application to present various user interfaces at the user device. The user interfaces can include, for example, a map display, an application icon grid display, a location comparison display, other types of displays, or the like. The user interfaces can be displayed to users to allow the users to quickly identify quality of experience information associated with one or more application programs accessed by the user device.

The quality of experience management service also can be configured to generate navigation directions based upon the quality of experience information. In addition to specifying route information such as an origin and/or destination, the user device can specify one or more quality of experience constraints that define, for example, a distance or time from the route the user is willing to travel for a specified quality of experience. The quality of experience management service can generate the navigation directions and provide the navigation directions to the user device as the quality of experience display data.

According to one aspect of the concepts and technologies disclosed herein, a method is disclosed. The method can include receiving, at a server computer executing a quality of experience management service, a request for quality of experience display data. The method also can include obtaining, by the server computer, location data defining a geographic location of a user device, analyzing, by the server computer, quality of experience information defining a quality of experience of an application program associated with the user device, generating, by the server computer, the quality of experience display data based upon the quality of experience information, and providing the quality of experience display data to the user device.

In some embodiments, obtaining the location data can include obtaining device data from the user device. The device data can include the location data and device quality of experience information collected by the user device. The quality of experience information can include quality of experience information collected by a network device in communication with the server computer and the quality of experience information can include a rule defining a metric and information identifying the application program. In some embodiments, the request can include receiving a request for navigation directions. Obtaining the location data can include obtaining, from the user device, device data including the location data, route information, and a quality of experience constraint to be considered during determination of a navigation route represented by the navigation directions. In some embodiments, the quality of experience constraint can include data specifying a time constraint. In some embodiments, the quality of experience constraint can include data specifying a data rate and a latency for a data session. In some embodiments, the quality of experience constraint can include data specifying a distance from the navigation route. Providing the quality of experience display data to the user device can include providing quality of experience display data including data for application icon display screen to be presented at the user device.

According to another aspect of the concepts and technologies disclosed herein, a system is disclosed. The system can include a processor and a memory storing computer-executable instructions. When the computer-executable instructions are executed by the processor, the processor can perform operations including receiving, from a user device, a request for quality of experience display data, obtaining location data defining a geographic location of the user device, analyzing quality of experience information defining a quality of experience of an application program executed by the user device, generating the quality of experience display data based upon the quality of experience information, and providing the quality of experience display data to the user device.

In some embodiments, obtaining the location data can include obtaining device data from the user device, the device data including the location data and device quality of experience information collected by the user device. Analyzing the quality of experience information can include analyzing the device data, a quality of experience rule, and quality of experience data obtained by a network device. The quality of experience information can include a rule defining a metric and information identifying the application program. Receiving the request can include receiving a request for navigation directions, and obtaining the location data can include obtaining, from the user device, device data including the location data, route information, and a quality of experience constraint to be considered during determination of a navigation route represented by the navigation directions. In some embodiments, generating the quality of experience display data can include generating the navigation route. Providing the quality of experience display data to the user device can include providing the navigation directions to the user device. In some embodiments, in response to a determination that the quality of experience constraint cannot be accommodated by the navigation route, the system can generate a request for a further quality of experience constraint from the user device. In some embodiments, generating the quality of experience display data can include generating data for an application icon display screen to be presented at the user device, and the quality of experience display data can define application programs and quality of experience information for each of the application programs.

According to yet another aspect, a computer storage medium is disclosed. The computer storage medium can have computer-executable instructions stored thereon. When the computer-executable instructions are executed by a processor, the processor can perform operations including receiving, from a user device, a request for quality of experience display data, obtaining location data defining a geographic location of the user device, analyzing quality of experience information defining a quality of experience of an application program executed by the user device, generating the quality of experience display data based upon the quality of experience information, and providing the quality of experience display data to the user device.

In some embodiments, receiving the request can include receiving a request for navigation directions, and obtaining the location data can include obtaining, from the user device, device data. The device data can include the location data, route information, and a quality of experience constraint to be considered during determination of a navigation route represented by the navigation directions. In some embodiments, generating the quality of experience display data can include generating the navigation route, and providing the quality of experience display data to the user device can include providing the navigation directions to the user device. In some embodiments, obtaining the location data can include obtaining device data from the user device. The device data can include the location data and device quality of experience information collected by the user device. Analyzing the quality of experience information can include analyzing the device data, a quality of experience rule, and quality of experience data obtained by a network device, and the quality of experience information can include a rule defining a metric and information identifying the application program.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
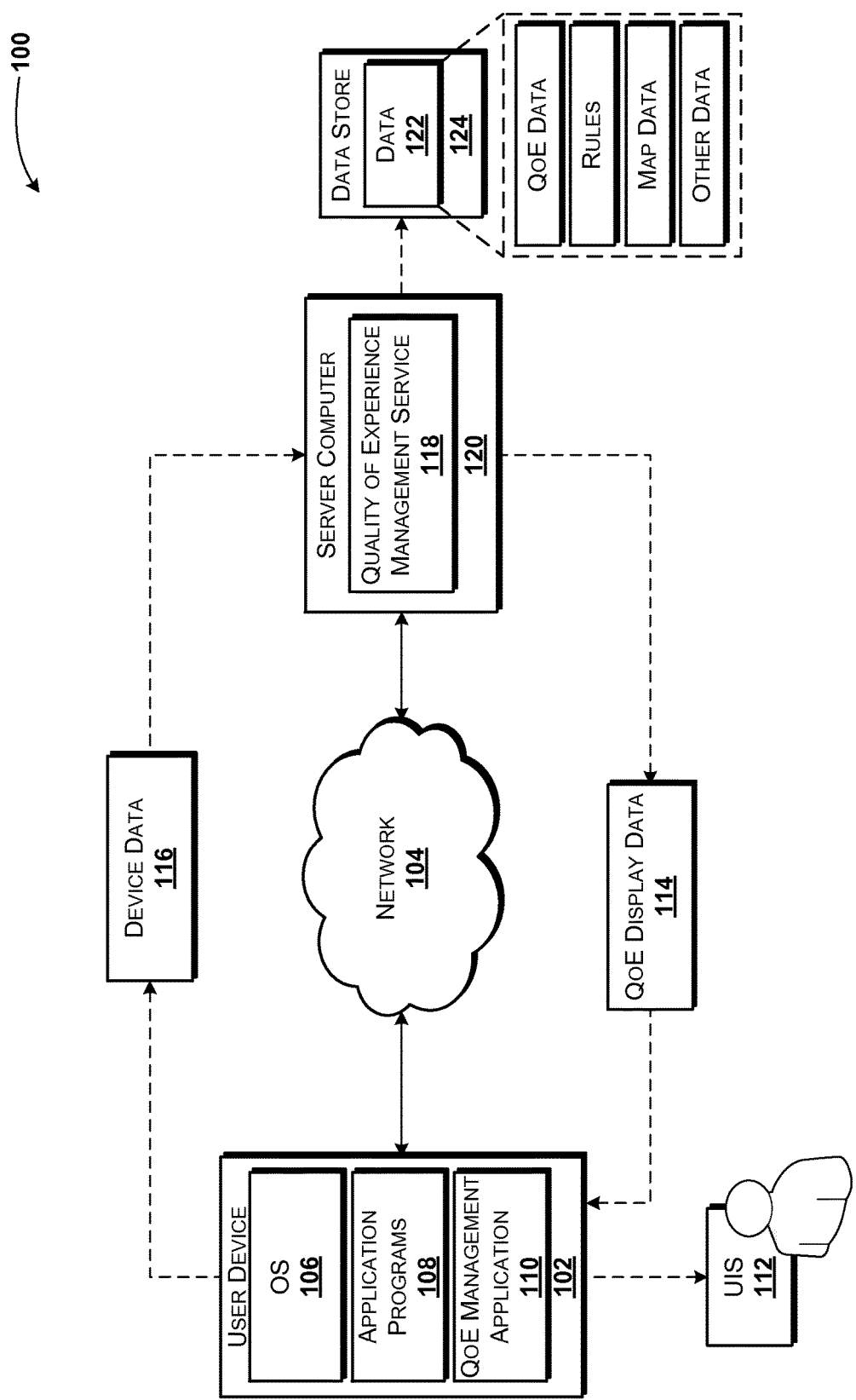
FIG. 1 is a system diagram illustrating an illustrative operating environment for the various embodiments disclosed herein.

The following detailed description is directed to collecting and using quality of experience information. A server computer can execute a quality of experience management service configured to provide quality of experience display data to a requestor such as a user device operating in communication with the server computer. The user device can execute a quality of experience application to collect device data that includes location data defining a geographic location of the user device and quality of experience information such as device and/or network performance or resource availability information. The user device can provide the device data to the quality of experience management service for use in generating and providing the quality of experience display data.

The quality of experience management service can analyze the device data and data stored at a data store that includes, for example, quality of experience data collected from any number of other devices and/or quality of experience information collected from network devices and/or systems. The quality of experience management service can analyze the data to generate quality of experience display data for presentation at the user device. The quality of experience display data can include data that can be interpreted by the quality of experience application to present various user interfaces at the user device. The user interfaces can include, for example, a map display, an application icon grid display, a location comparison display, other types of displays, or the like.

The quality of experience management service also can be configured to generate navigation directions based upon the quality of experience information. In addition to specifying route information such as an origin and/or destination, the user device can specify one or more quality of experience constraints that define, for example, a distance or time from the route the user is willing to travel for a specified quality of experience. The quality of experience management service can generate the navigation directions and provide the navigation directions to the user device as the quality of experience display data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for collecting and using quality of experience information will be described, according to an illustrative embodiment. The operating environment 100 shown in FIG. 1 includes a user device 102 operating in communication with and/or as part of a communications network ("network") 104. According to various embodiments of the concepts and technologies disclosed herein, the functionality of the user device 102 can be provided by a smartphone. The functionality of the user device 102 also can be provided by other computing systems such as, for example, server computers, desktop computers, laptop computers, tablet computers, set-top boxes, embedded computing systems, in-vehicle computing systems, other computing systems, or the like. For purposes of describing the concepts and technologies disclosed herein, the user device 102 is described as a smartphone. It should be understood that this embodiment is illustrative, and should not be construed as being limiting in any way.

The user device 102 can execute an operating system 106, one or more application programs 108, and a quality of experience management application (also referred to herein and the "quality of experience application") 110 (labeled as "QoE management application" in FIG. 1). The operating system 106 is a computer program for controlling the operation of the user device 102. The application programs 108 and the quality of experience management application 110 can include executable programs configured to execute on top of the operating system 106. The application programs 108 can include almost any type of Web-applications and/or natively executed applications executable to provide various functions. For example, the application programs 108 can include mapping/navigation applications, web browsers, media playback applications, voice and/or data communication applications, email applications, messaging programs, diagnostic applications, video conferencing applications, combinations thereof, or the like.

The quality of experience application 110 can be to generate and/or display a visual representation of quality of experience ("QoE") information in one or more user interfaces ("UIs") 112. The UIs 112 can be generated by the quality of experience application 110 based upon quality of experience information obtained from various sources. In one contemplated embodiment, shown in FIG. 1, the UIs 112 can be based upon quality of experience display data 114 received from a quality of experience management service 118 executing on a computing device such as, for example, a server computer 120. The quality of experience management service 118 will be described in additional detail below. Because the quality of experience display data 114 can be obtained from additional and/or alternative applications and/or devices, it should be understood that this embodiment is illustrative, and should not be construed as being limiting in any way.

The UIs 112 generated by the quality of experience application 110 can be provided in various visual formats and/or displays. According to various implementations, the quality of experience application 110 can be configured to provide the quality of experience display data 114 in one or more of map displays, graph displays, histogram displays, density map displays, application display grids that show a known or expected quality of experience associated with each application in the application display grid, numerical data displays, combinations thereof, or the like. The quality of experience application 110 can also be configured to provide a UI 112 for presenting navigation directions. Thus, the quality of experience display data 114 can correspond to navigation directions generated by the quality of experience management service 118 and/or a routing application based upon quality of experience information. Some example UIs 112 for presenting the quality of experience display data 114 are illustrated and described below, particularly with reference to FIGS. 5A-5C.

The quality of experience application 110 can be configured to collect quality of experience information indicating operating conditions, network conditions, and/or other information at or near the user device 102. For example, the quality of experience application 110 can collect quality of experience information indicating a latency, an available bandwidth, an available amount of memory, a processor utilization and/or availability, frequency utilization and/or availability, channel information, data upload and/or download speeds, voice quality information, standard and/or protocol information, combinations thereof, or the like. The quality of experience application 110 can collect these and other quality of experience information at the user device 102 and/or obtain these or other quality of experience information from one or more systems, devices, applications, or nodes of the network 104, and generate device data 116 that includes these and/or other types of data.

The quality of experience application 110 also can collect location data indicating a geographic location of the user device 102. According to various embodiments, the location data can be generated by a global positioning system ("GPS") chip, a short range radio of the user device 102, and/or other components of the user device 102. The location data also can be generated by a location server operating on the network 104 and communicating with the user device 102. As such, the geographic location of the user device 102 can be determined using GPS technologies, BLUETOOTH beacons, WIFI signals, network-radio-based technologies such as triangulation, tower information, and/or ping-based location determinations, combinations thereof, or the like. Thus, the location data can indicate a geographic location that is accurate to within about five to fifty meters in the case of GPS data, BLUETOOTH signals, and/or WIFI signals; and/or geographic information that is accurate to within about two hundred meters in the case of network-radio-based location technologies such as triangulation, tower information, or the like. The quality of experience application 110 also can include the location data in the device data 116.

The device data 116 also can include quality of experience constraints and route information used to provide navigation directions, as will be described in more detail herein, particularly with reference to FIGS. 4 and 5D. The route information can include at least an address, coordinates, and/or other indications of an origin and a destination. The quality of experience constraints can include various quality of experience considerations specified by a user to modify the navigation directions based upon anticipated quality of experience conditions in the network 104. As used herein, the phrase "quality of experience constraints" include at least data indicating a size or rate of a data transfer to be completed during a data session, as well as a time constraint indicating a time at which the data session is to occur. The time constraint can be expressed as a date and time, a time range, or as a time at which a countdown timer expires. These and other aspects of the quality of experience constraints are explained in more detail below.

The quality of experience application 110 can collect the location data and the quality of experience information and provide the data to the quality of experience management service 118 as the device data 116. While referred to herein as "device data," it should be understood from the above description that the device data 116 can represent network conditions and/or device conditions at or near the user device 102, a geographic location of the user device 102, and/or quality of experience constraints as described herein. Thus, as used herein, the phrase "device data" refers to data indicating at least a geographic location of the user device 102 and quality of experience information indicating an available bandwidth and latency of a data connection associated with the user device 102. The quality of experience application 110 can provide the device data 116 to the quality of experience management service 118 to provide the quality of experience display data 114 for providing to a user in a UI 112.

To provide the quality of experience display data 114, the quality of experience management service 118 can be configured to generate, store, modify, access, and/or use the device data 116 in combination with various data 122 available to the quality of experience management service 118. In the illustrated embodiment, the data 122 is stored at a data storage device such as, for example, a data store 124 that is accessible to the quality of experience management service 118. According to various embodiments, the functionality of the data store 124 can be provided by one or more real or virtual resources including, but not limited to, databases, server computers, desktop computers, mobile telephones, laptop computers, other computing systems, and the like. In the illustrated embodiments, the functionality of the data store 124 is provided by a database hosted on a server computer. It should be understood that this embodiment is illustrative, and should not be construed as being limiting in any way.

The data 122 can include quality of experience data, quality of experience rules, map data, and other data. The quality of experience data can include various quality of experience metrics such as the quality of experience information collected by the user device 102, as well as quality of experience information collected by various systems or devices operating as a part of and/or in communication with the network 104. Thus, the quality of experience data can include quality of experience information associated with the network and the user device 102 as well as quality of experience information associated with the network 104.

The quality of experience data can include information collected by network elements and can include, for example, utilization and/or availability of network communication resources; frequency utilization and/or overlap; network traffic; bandwidth usage and/or availability; server traffic, utilization, and/or availability; network latency; other considerations; or the like. These and other types of quality of experience information can be collected for each communications device in the network 104 and can be cross-referenced with and/or can include location information that can be used to determine a geographic location of the communications device with which the data corresponds. Thus, the quality of experience data can include quality of experience information for the network 104 and the user device 102.

The quality of experience rules can define various rules defining quality of experience considerations for particular users, applications, devices, and/or geographic locations. In one embodiment, the quality of experience rules define particular metrics that are to be considered when generating the quality of experience display data 114 indicating quality of experience for a particular application program 108 executing at the user device 102. Thus, the phrase "quality of experience rule" and variants thereof is used herein to refer to a rule defining a particular type of quality of experience data ("metric") and/or a number of metrics that are considered to gauge quality of experience of a particular application program 108. Thus, for example, the quality of experience rules can define a rule that defines a metric for a particular voice conferencing application as being data transfer rate. Another of the quality of experience rule can define a rule that defines a metric for a messaging program as being latency and data transfer rate. Thus, the rules and the quality of experience data can be used to determine a quality of experience of a particular application program 108 executing at the user device 102 based upon the quality of experience data, which as explained above includes quality of experience information collected at the user device and quality of experience information collected at the network 104.

The map data can include maps, road information, address information, routing algorithms, or the like for generating navigation directions for users. The map data can be used by the quality of experience management service 118 or a routing application invoked by the quality of experience management service 118 to generate navigation directions. As mentioned above, the quality of experience management service 118 can generate navigation directions based upon quality of experience considerations. Thus, it can be appreciated that the quality of experience management service 118 can use the quality of experience data, the quality of experience rules, and the map data to provide the navigation directions. The navigation directions also can be based upon one or more quality of experience constraints, which can be obtained from the user device 102 as or in the device data 116, and included in the data 122 as the other data.

The other data can include the quality of experience constraints, as well as other information. The other information can include, for example, user or device preferences, device capabilities, permissions and/or account information, historical network trends and/or other information, and/or other information that can be used by the quality of experience management service 118 to provide the functionality described herein. In some embodiments, the user device 102 can be configured to present a display screen or dashboard to a user for use in configuring various preferences associated with the quality of experience application 110 and/or the quality of experience management service 118. For example, the user device 102 can present a dashboard or display screen whereby a user can select a quality of experience metric or combination of metrics to be considered in determining a quality of experience. In some embodiments, the user can specify one or more metrics for one or more of the application programs 108. Thus, as will be appreciated with reference to FIG. 5E, quality of experience indicators associated with application programs 108 can be based upon quality of experience metrics specified by the user or other authorized entities.

The quality of experience management service 118 can be configured to obtain the device data 116 from the user device 102, and to store some or all of the device data 116 in the data store 124. Although not shown in FIG. 1, the quality of experience management service 118 can be configured to collect device data 116 from multiple devices operating in communication with the network 104. In some embodiments, the device data 116 is collected from each device operating in communication with the network 104. As such, the quality of experience management service 118 can collect network performance and/or other quality of experience information from many, if not all, devices operating in communication with the network 104, thereby enabling the quality of experience management service 118 to obtain a picture of network performance and quality of experience at a particular time.

The quality of experience management service 118 can use these and other data stored as the data 122 to generate quality of experience display data 114 at the user device 102. As mentioned above, the user device 102 can be configured to generate one or more UIs 112 for presenting the quality of experience display data 114 in a visual representation that shows quality of experience for particular application programs 108 and/or functions at the user device 102. According to various embodiments, the quality of experience application 110 obtains the quality of experience display data 114 and generates the UIs 112 at the user device 102. In some embodiments, the quality of experience application 110 can apply various user settings and/or preferences to the quality of experience display data 114 during generation of the UIs 112. These and additional aspects of displaying the quality of experience display data 114 at the user device 102 are illustrated and described in more detail below with reference to FIGS. 2-5E.

In practice, the user device 102 executes a number of application programs 108 and the quality of experience management application 110. The application programs 108 can include various types of applications that rely upon network communications to provide certain functions and/or information. The quality of experience management application 110 can request quality of experience display data 114 from the quality of experience management service 118 for purposes of generating and presenting one or more UIs 112 that display quality of experience information to a user.

The quality of experience application 110 can collect and send device data 116 including location data and network operating conditions to the quality of experience management service 118. The quality of experience management service 118 can analyze the device data 116 and the data 122 stored at the data store 124 to determine a quality of experience at various geographic locations including, for example, a geographic location at which the user device 102 is located or will be located at some time. The quality of experience management service 118 can generate quality of experience display data 114 based upon this analysis and provide the quality of experience display data 114 to the user device 102.

In generating the quality of experience display data 114, the quality of experience management service 118 can define a matrix or table of data. The matrix or table can define, at least, geographic locations, an application program 108 for which quality of experience information applies, the identity of the type of quality of experience information presented, and a value of the quality of experience information. An example table or matrix of data that can correspond to the quality of experience display data 114 is provided below in TABLE 1.

TABLE 1

| Location | Application | Metric | Value | Other |
|---|---|---|---|---|
| +40° 40' 8.46", −73° 56' 34.27" | AT&T Video Conferencing | Latency; Upload; Download | 27 ms; 1567 Mbps; 3734 Mbps | DataA |
| 27361 | Email Application | Upload | 687 Mbps | DataB |

It should be understood that the quality of experience display data 114 can have hundreds, thousands, tens of thousands, hundreds of thousands, or even millions of data points, depending upon a geographic location for which quality of experience display data 114 is provided, and that the above example table is therefore merely illustrative of the quality of experience display data 114.

The quality of experience application 110 can obtain the quality of experience display data 114 and generate one or more UIs 112 for presenting the quality of experience display data 114 in a visual representation. As noted above, the quality of experience display data 114 can include thousands or more of locations and associated quality of experience information. A map display, for example, can define geographic locations as boundaries and quality of experience information that applies within the defined boundaries. Additionally, or alternatively, a map display can define multiple locations and associated quality of experience information and the quality of experience application 110 can be configured to generate the UIs 112 to reflect the readings. Some illustrative embodiments of the UIs 112 are illustrated and described in more detail below with reference to FIG. 5A-5C.

FIG. 1 illustrates one user device 102, one network 104, one server computer 120, and one data store 124. It should be understood, however, that various implementations of the operating environment 100 include multiple user devices 102, multiple networks 104, multiple server computers 120, and/or multiple data stores 124. As such, the illustrated embodiment should be understood as being illustrative, and should not be construed as being limiting in any way.

Figure 2:
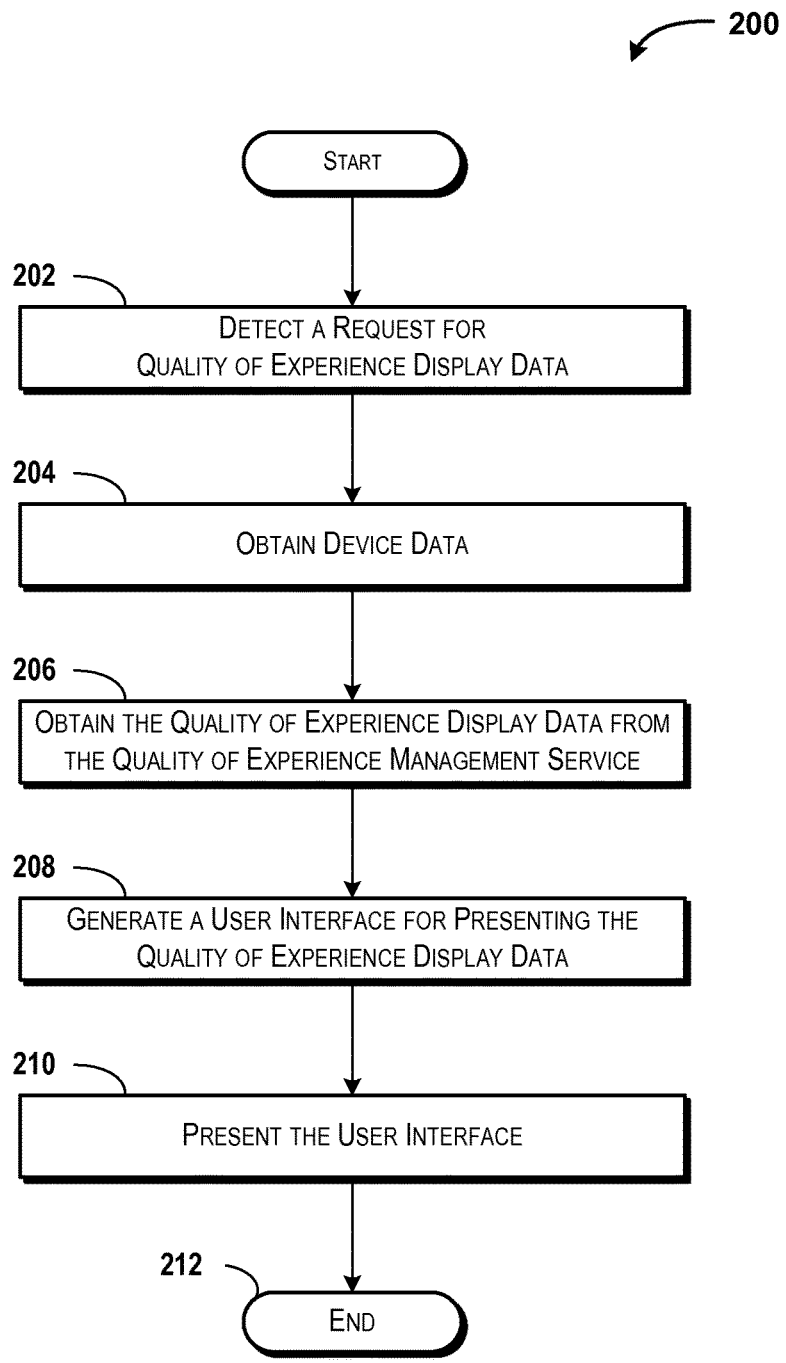
FIG. 2 is a flow diagram showing aspects of a method for displaying quality of experience information at a user device, according to an illustrative embodiment.

Turning now to FIG. 2, aspects of a method 200 for displaying quality of experience information at a user device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 120 to perform one or more operations and/or causing the processor to direct other components of the computing system or device to perform one or more of the operations.

For purposes of illustrating and describing the concepts of the present disclosure, the methods 200 is described as being performed by the user device 102 via execution of one or more software modules such as, for example, the quality of experience management application 110. It should be understood that additional and/or alternative devices and/or network nodes can provide the functionality described herein via execution of one or more modules, applications, and/or other software including, but not limited to, the quality of experience management application 110. Thus, the illustrated embodiment of the method 200 is illustrative, and should not be viewed as being limiting in any way.

The method 200 begins at operation 202, wherein the user device 102 detects a request for quality of experience display data 114. The user device 102 can detect the request for quality of experience display data 114 by detecting a command or other input for accessing a quality of experience display such as one or more of the UIs 112 described herein. Additionally or alternatively, the user device 102 can detect the request for quality of experience display data 114 by detecting activation of the quality of experience application 110 at the user device 102. In some embodiments, the quality of experience application 110 is activated during startup or powering-on of the user device 102, and the user device 102 can therefore detect the request for quality of experience display data 114 at startup of the device. Because the user device 102 can detect the request for the quality of experience display data 114 at these and other times, the above examples are illustrative and should not be construed as being limiting in any way.

From operation 202, the method 200 proceeds to operation 204, wherein the user device 102 obtains the device data 116. As explained above, the device data 116 obtained by the user device 102 can include at least location data and quality of experience information indicating a latency and speed of a data connection. The device data 116 also can include other information such as, for example, device utilization information, trajectory information, orientation information, battery and/or other resource availability information, combinations thereof, or the like.

The location data obtained in operation 202 can include information specifying a geographic location of the user device 102 and trajectory information that can be interpreted by the quality of experience application 110 and/or the quality of experience management service 118 to determine a current location of the user device 102 and/or an expected location of the user device 102 at a particular time. In operation 204, the user device 102 can obtain a location using a location component of the user device 102 such as, for example, a GPS chip(s), network information, or other resources. The user device 102 also can determine trajectory information such as, for example, a bearing, speed, and/or other information using these or other components of the user device 102 and/or the network 104. Thus, the device data 116 obtained in operation 204 can be used to determine a location of the user device 102 at a particular time as well as an expected position at some other time, and network and/or device conditions at or near the user device 102. Because the device data 116 can include additional information, it should be understood that this embodiment is illustrative, and should not be construed as being limiting in any way.

From operation 204, the method 200 proceeds to operation 206, wherein the user device 102 obtains quality of experience display data 114 from the quality of experience management service 118. To obtain the quality of experience display data 114, the user device 102 can generate a request for the quality of experience display data 114 and transmit the request or the quality of experience management service 118 with the device data 116 obtained in operation 204. Thus, the quality of experience management service 118 can receive the request for the quality of experience display data 114, location information associated with the user device 102, and quality of experience information associated with the user device 102.

In some embodiments, the user device 102 can transmit the device data 116 to the quality of experience management service 118, and the quality of experience management service 118 can be configured to recognize submission of the device data 116 as a request for the quality of experience display data 114. As such, user device 102 can be configured to "request" the quality of experience display data 114 by submitting the device data 116. The generation of the quality of experience display data 114 by the quality of experience management service 118 will be explained in more detail below, particularly with reference to FIGS. 3-4. It should be understood that operation 206 also can include the user device 102 receiving the quality of experience display data 114 from the quality of experience management service 118.

From operation 206, the method 200 proceeds to operation 208, wherein the user device 102 generates one or more UIs 112 for presenting the quality of experience display data 114 obtained in operation 206. The user device 102 can process the quality of experience display data 114 to generate the UIs 112 by determining a type of display to be generated and generating the display as the UIs 112. Thus, for example, if the quality of experience display data 114 received in operation 208 corresponds to a quality of experience map (as will be illustrated and described in additional detail below with reference to FIG. 5A), the user device 102 can generate a UI 112 for presenting the quality of experience map based upon location information and quality of experience information included in the quality of experience display data 114. Because functionality of computing devices for rendering and/or displaying visual data is generally understood, these aspects of the quality of experience application 110 are not discussed in additional detail, though some example UIs 112 are illustrated and described to demonstrate some embodiments of the visual displays disclosed herein.

From operation 208, the method 200 proceeds to operation 210, wherein the user device 102 presents the quality of experience display data 114 in the one or more UIs 112 generated in operation 208. The user device 102 can display the UIs 112 at the user device 102, for example on a display screen, or output the UIs 112 to other devices at or near the user device 102. For example, the user device 102 can export the UIs 112 to a display screen in communication with the user device 102 via a communications link, if desired. Because presenting UIs 112 is generally understood, the presentation of the UIs generated in operation 208 will not be further described herein for the sake of brevity.

From operation 210, the method 200 proceeds to operation 212. The method 200 ends at operation 212.

Figure 3:
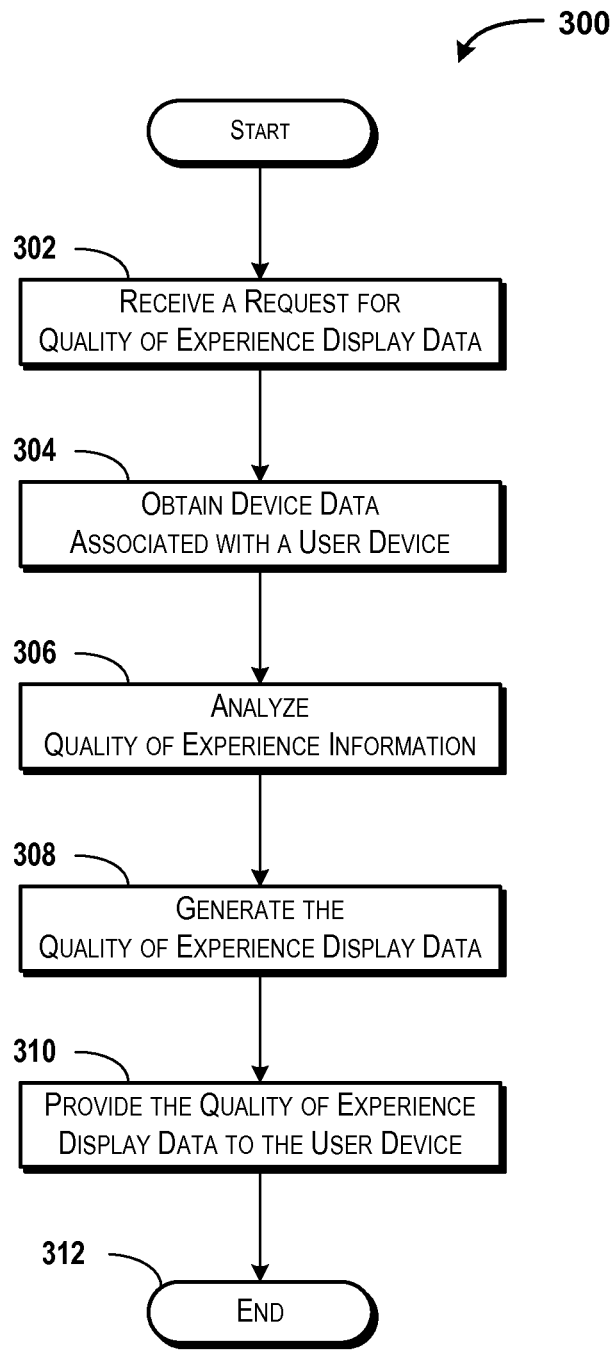
FIG. 3 is a flow diagram showing aspects of a method for generating quality of experience display data, according to another illustrative embodiment.

Turning now to FIG. 3, aspects of a method 300 for generating quality of experience display data will be described in detail, according to an illustrative embodiment. For purposes of illustrating and describing the concepts of the present disclosure, the methods 300, 400 are described as being performed by the server computer 120 via execution of one or more software modules such as, for example, the quality of experience management service 118. It should be understood that additional and/or alternative devices and/or network nodes can provide the functionality described herein via execution of one or more modules, applications, and/or other software including, but not limited to, the quality of experience management service 118. Thus, the illustrated embodiments are illustrative, and should not be viewed as being limiting in any way.

The method 300 begins at operation 302, wherein the server computer 120 detects a request for quality of experience display data 114. In some embodiments, the request for the quality of experience display data 114 can be received from the user device 102, as explained above with reference to FIG. 2. In some other embodiments, the request of the quality of experience display data 114 can be received from other devices, applications, and/or nodes. For purposes of illustrating and describing the concepts and technologies disclosed herein, the method 300 is described with reference to an embodiment in which the request of the quality of experience display data 114 is received from the user device 102.

From operation 302, the method 300 proceeds to operation 304, wherein the server computer 120 obtains device data 116 associated with the user device 102. As explained above with reference to FIGS. 1-2, the device data 116 can include location information associated with the user device 102 and quality of experience information associated with the user device 102. The device data 116 also can include quality of experience constraints, device resource information, trajectory information, combinations thereof, or the like. In some embodiments, the device data 116 is obtained from the user device 102 and in other embodiments, the device data 116 can be obtained by the server computer 120 from the data 122 stored in the data store 124.

From operation 304, the method 300 proceeds to operation 306, wherein the server computer 120 analyzes quality of experience information. In addition to analyzing the quality of experience information included in the device data 116 obtained in operation 304, the server computer 120 can obtain quality of experience information stored at the data store 124 as the data 122, which can include quality of experience data, rules, map data, other data, or the like. Thus, operation 306 can include the server computer 120 obtaining and analyzing quality of experience information included in the device data 116, as well as the data 122. During the analysis of the quality of experience information, the server computer 120 can identify and/or generate a geographic area, time constraints, and quality of experience findings associated with the quality of experience display data 114 to be generated. Each of these aspects of the quality of experience display data 114 are described in more detail below.

The geographic area can be determined by the server computer 120 based upon the location data included in the device data 116 obtained in operation 304. In some embodiments, the server computer 120 is configured to determine the geographic area as a defined radius around the geographic location of the user device 102. In some embodiments, the radius is defined as ten feet, fifty meters, one thousand feet, three miles, ten miles, or the like. In some other embodiments, the server computer 120 determines the radius based upon a trajectory of the user device 102 and the time constraints. Thus, for example, if the time constraints specify ten minutes, the server computer 120 can be configured to determine radius based upon determining where the user device 102 can be, based upon a detected trajectory, within a ten minute window. If the trajectory corresponds to sixty miles per hour, and the time constraints specify ten minutes, the server computer 120 can define the radius as ten miles. It should be understood that this embodiment is illustrative, and should not be construed as being limiting in any way.

The time constraints, as noted above, can correspond to a time for which or at which the determined quality of experience display data 114 applies or will apply. Because network conditions can change with time, the quality of experience display data 114 can have an effective time that is defined by the time constraints. Thus, the quality of experience display data 114 can specify, for example, that the determined quality of experience information applies for the next thirty seconds, one minute, ten minutes, one hour, one day, or the like. The time constraints can be determined by the server computer 120 based upon location information, traffic patterns, historical trends, combinations thereof, or the like.

The quality of experience findings can correspond to actual quality of experience values associated with the particular locations and/or times determined by the server computer 120. Thus, the server computer 120 can determine, for example, that latency at or near a particular street address is fifteen milliseconds, and that the latency at this location is expected to remain at or near fifteen milliseconds for the next ten minutes. In this example, "a latency of fifteen milliseconds" can correspond to the quality of experience finding, the time constraints can correspond to the next ten minutes, and the geographic area can correspond to at or near the street address. It should be understood that this embodiment is illustrative, and should not be construed as being limiting in any way.

In analyzing the various quality of experience information collected by the server computer 120, the server computer 120 can also consider one or more rules included in the data 122 described herein. As noted above, the rules can define particular quality of experience information that is relevant to a particular application program 108 executing at the user device 102. The rules can define what quality of experience information is relevant to which application programs 108, and the server computer 120 can therefore narrow its analysis based upon the rules, if desired.

From operation 306, the method 300 proceeds to operation 308, wherein the server computer 120 generates the quality of experience display data 114. The server computer 120 can generate the quality of experience display data 114 to reflect the quality of experience information analysis in operation 306. In some embodiments, the server computer 120 can generate a table or matrix that defines geographic locations, application programs 108, quality of experience metrics or considerations relevant to the application programs 108, quality of experience findings as described above, other information, combinations thereof, or the like. An example of the quality of experience display data 114 is shown in TABLE 1 described above with reference to FIG. 1. Because the quality of experience display data 114 can be provided in additional and/or alternative formats, it should be understood that this embodiment is illustrative, and should not be construed as being limiting in any way.

From operation 308, the method 300 proceeds to operation 310, wherein the server computer 120 provides the quality of experience display data 114 generated in operation 308 to the user device 102. The server computer 120 therefore can respond to the request received in operation 302 by providing the quality of experience display data 114 in operation 310. Because the server computer 120 can be called or invoked by other devices in addition to, or instead of, the user device 102, it should be understood that this example is illustrative and should not be construed as being limiting in any way.

From operation 310, the method 300 proceeds to operation 312. The method 300 ends at operation 312.

While not illustrated in FIG. 3, it should be understood that the server computer 120 can be configured to take various actions in addition to generating the quality of experience display data 114 described herein. In particular, in some embodiments the quality of experience management service 118 can be configured to generate suggestions or instructions for the user device 102 to improve quality of experience and/or to provide ways in which a user can improve quality of experience. For example, the server computer 120 can be configured to instruct a user device 102 operating on a cellular data connection that a wireless local area network ("WLAN") connection, for example a WIFI network connection, is available at some location. Thus, for example, the server computer 120 can inform the user device 102 that a WIFI connection is available at the geographic location of the user device 102 and generate instructions for switching the user device 102 to the WIFI data connection to improve quality of experience and/or to reduce costs to the user. Because additional and/or alternative actions can be taken by the server computer 120, it should be understood that this example is illustrative, and should not be construed as being limiting in any way.

Figure 4:
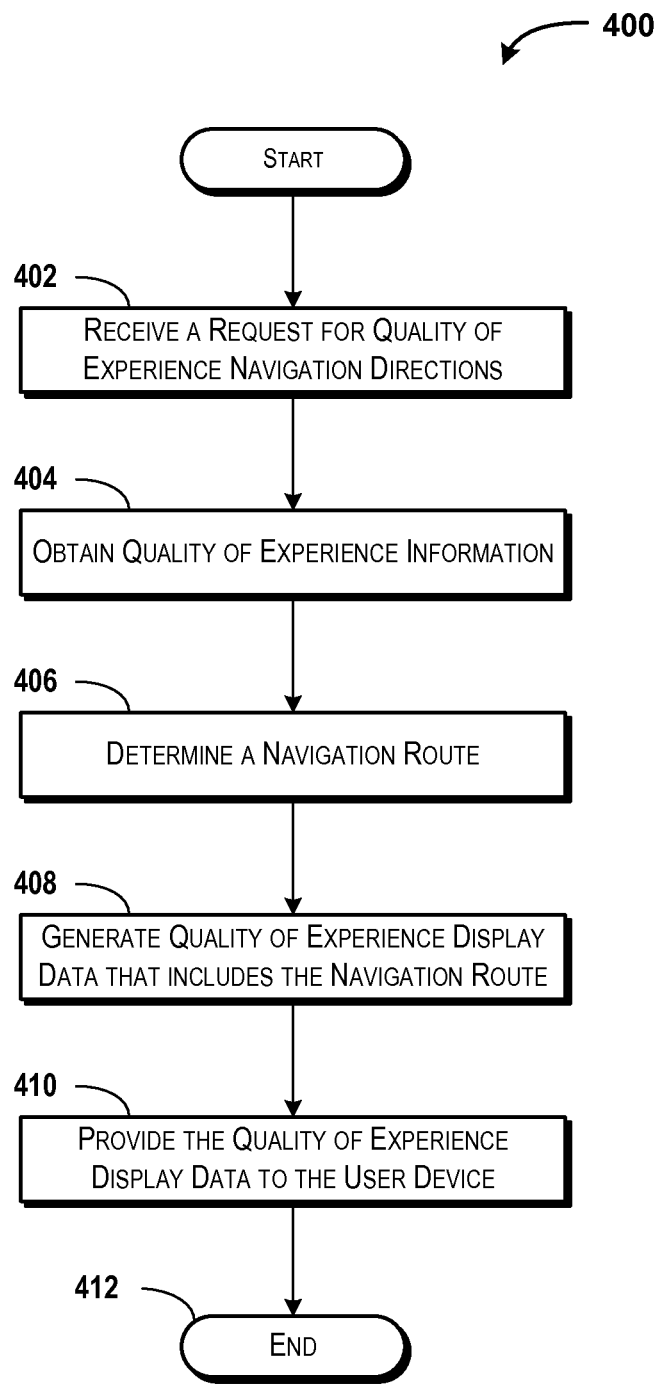
FIG. 4 is a flow diagram showing aspects of a method for generating navigation directions based upon quality of experience information, according to another illustrative embodiment.

Turning now to FIG. 4, aspects of a method 400 for generating navigation directions based upon quality of experience information will be described in detail, according to an illustrative embodiment. In some embodiments of the concepts and technologies disclosed herein, navigation directions can be obtained. The navigation directions can include a location at which a desired or needed quality of experience exists. Thus, users or other entities can obtain a navigation route to accommodate quality of experience needs or desires in accordance with some embodiments of the concepts and technologies disclosed herein.

The method 400 begins at operation 402, wherein the server computer 120 receives a request for navigation directions. In various implementations, the request for navigation directions received in operation 402 can be received from a user device such as the user device 102 illustrated in FIG. 1, though this is not necessarily the case. The request for quality of experience navigation directions can be received in a number of ways. For example, a device of a requestor, for example the user device 102, can explicitly request quality of experience navigation directions. In some other embodiments, the server computer 120 can receive a request by receiving the device data 116, wherein the device data 116 includes one or more quality of experience constraints and route information including an origin and a destination. Because the functionality described herein for generating quality of experience navigation directions can be invoked or requested in a number of ways in addition to, or instead of, the above examples, it should be understood that these examples are illustrative, and should not be construed as being limiting in any way.

From operation 402, the method 400 proceeds to operation 404, wherein the server computer 120 obtains quality of experience information. In operation 404, the server computer 120 can obtain device data 116 from the user device 102, wherein the device data 116 can include location information associated with the user device 102, quality of experience information associated with the user device 102, one or more quality of experience constraints, and route information. The server computer 120 also can obtain the data 122 from the data store 124.

As mentioned above, the route information can include data specifying an origin and data specifying a destination. The quality of experience constraints can be used in generating navigation directions between the defined origin and destination based upon quality of experience information. The quality of experience constraints can include, for example, a data size or rate desired or needed and time constraints that define a time window or time during or at which the data size or rate is needed or desired. In some embodiments, the quality of experience constraints further can include a route deviation limit, which can be expressed in terms of time or distance and can define an amount a user is willing to deviate from his or her route to conduct the data session of the size or rate and at the time as defined by the quality of experience constraints. Thus, the quality of experience constraints can be used to determine detours for a navigation route to support specified data communications.

From operation 404, the method 400 proceeds to operation 406, wherein the server computer 120 determines a navigation route. The server computer 120 can determine, based upon the information obtained in operation 404, a navigation route for the user. In some embodiments, the quality of experience management service 118 can generate or request generation of a route between the origin and destination included in the route information and identify a location along the route at which a quality of experience meets or exceeds the quality of experience constraints defined. If a location along the route does not meet or exceed the specified quality of experience constraints, the server computer 120 can search within a defined route deviation limit for a location that meets or exceeds the defined quality of experience constraints.

If a location meeting or exceeding the quality of experience constraints is identified, the location can be added to the navigation route as a detour or destination. If no location along the route or within the defined route deviation limit meets or exceeds the quality of experience constraints, the server computer 120 can generate instructions for informing the requestor, and the requestor can modify the quality of experience constraints. Thus, the navigation route generated in operation 406 can include a via, detour, or destination at which the quality of experience matches the quality of experience constraints.

From operation 406, the method 400 proceeds to operation 408, wherein the server computer 120 generates quality of experience display data 114 that includes the navigation route determined in operation 406. The server computer 120 can generate turn directions for including in the quality of experience display data 114. Thus, the quality of experience display data 114 generated in operation 408 can specify locations of turns, directions of turns, or the like.

From operation 410, the method 400 proceeds to operation 412, wherein the server computer 120 provides the quality of experience display data 114 generated in operation 408 to the user device 102. Thus, the server computer 120 can respond to the request received in operation 402 by providing the quality of experience display data 114 generated in operation 408 to the requestor in operation 410.

From operation 412, the method 400 proceeds to operation 414. The method 400 ends at operation 414.

Figure 5A:
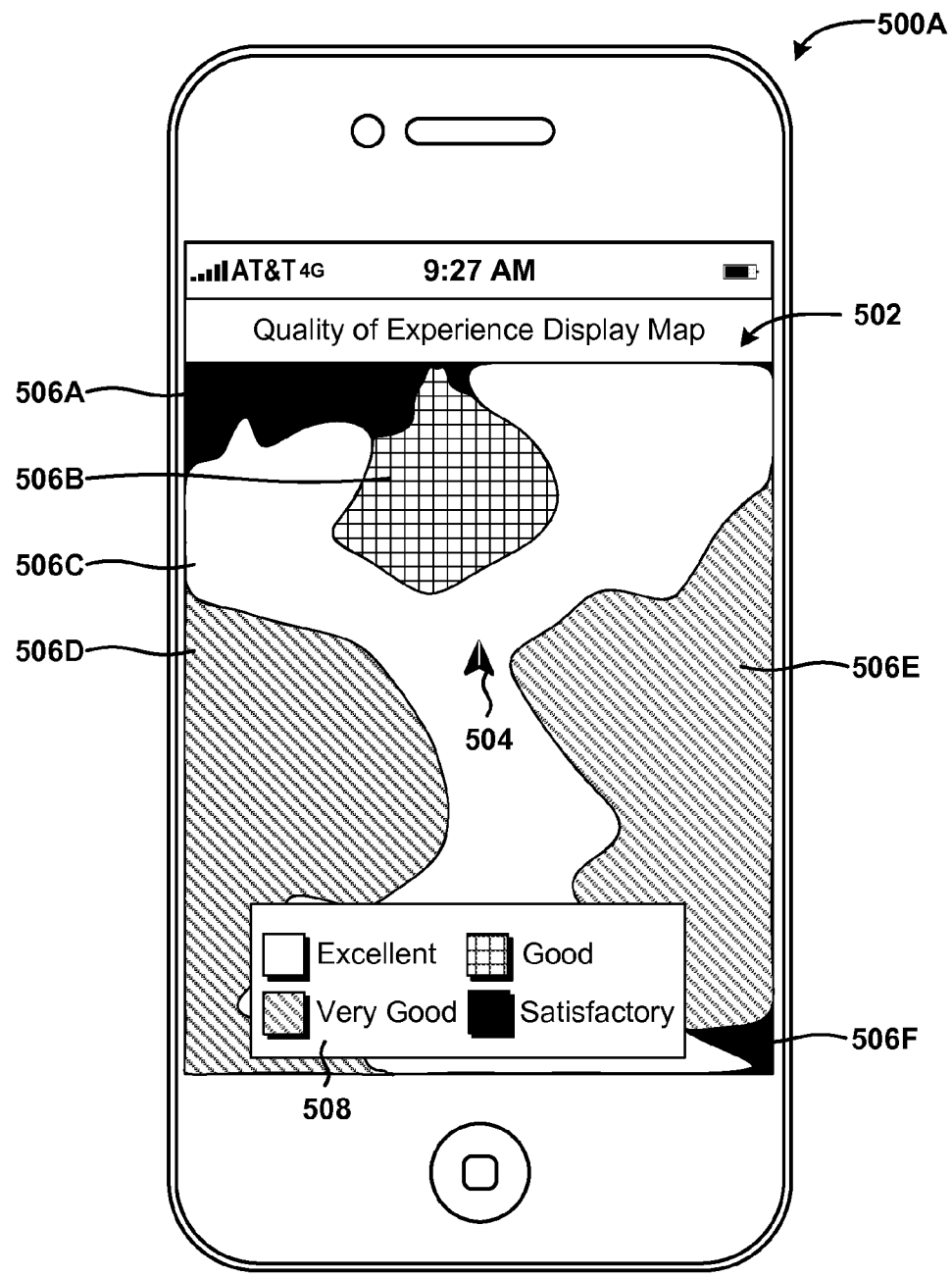
FIGS. 5A-5E are user interface ("UI") diagrams showing aspects of UIs for collecting and using quality of experience information, according to some illustrative embodiments.

FIGS. 5A-5E are user interface ("UI") diagrams showing aspects of UIs for collecting and using quality of experience information, according to some illustrative embodiments. FIG. 5A shows an illustrative screen display 500A generated by a device such as the user device 102. According to various embodiments, the user device 102 can generate the screen display 500A and/or other screen displays in conjunction with and/or based upon data received from the quality of experience management service 118 described herein. It should be appreciated that the UI diagram illustrated in FIG. 5A is illustrative of one contemplated example of the UIs 112 and therefore should not be construed as being limited in any way.

Although not shown in FIG. 5A, the screen display 500A can include various menus and/or menu options. The screen display 500A also can include a quality of experience display map 502. The quality of experience display map 502 can provide a visual representation of quality of experience information at, near, or remote from the user device 102. In the illustrated embodiment, the quality of experience display map 502 is illustrated as including a location indicator icon 504. The location indicator icon 504 can display, on the quality of experience display map 502, a location of the user device 102. It should be understood that the location of the user device 102 can be determined by the user device 102 and/or by other systems or devices operating as a part of or in communication with the network 104.

The quality of experience display map 502 also is illustrated as having a number of regions or geographic areas ("regions") 506A-F (hereinafter collectively and/or generically referred to as "regions 506"). As shown in FIG. 5A, the regions 506 can be color-coded, pattern coded, and/or otherwise visually distinguishable from one another based upon a quality of experience associated with the geographic area corresponding to the regions 506 on the quality of experience display map 502. Although not visible in FIG. 5A, it should be understood that the regions 506 can be configured as translucent or transparent overlays on top of a map or other layer. As such, streets, geographic features, landmarks, or the like can be displayed on the quality of experience display map 502, if desired.

The quality of experience display map 502 also includes a legend 508. The legend can define what the displayed patterns or colors displayed in the quality of experience display map 502 correspond to in terms of quality of experience. In the illustrated embodiment, the legend 508 defines four grades of quality of experience and associated patterns. It should be understood from the above description, that the legend 508 and the regions 506 can be determined by the quality of experience management service 118 based upon rules, quality of experience information from the user device 102, quality of experience information from the network 104, map data, device data 116, or the like. Because the illustrated example quality of experience display map 502 is merely illustrative of one contemplated embodiment, the quality of experience display map 502 shown in FIG. 5A should not be construed as being limiting in any way.

Figure 5B:
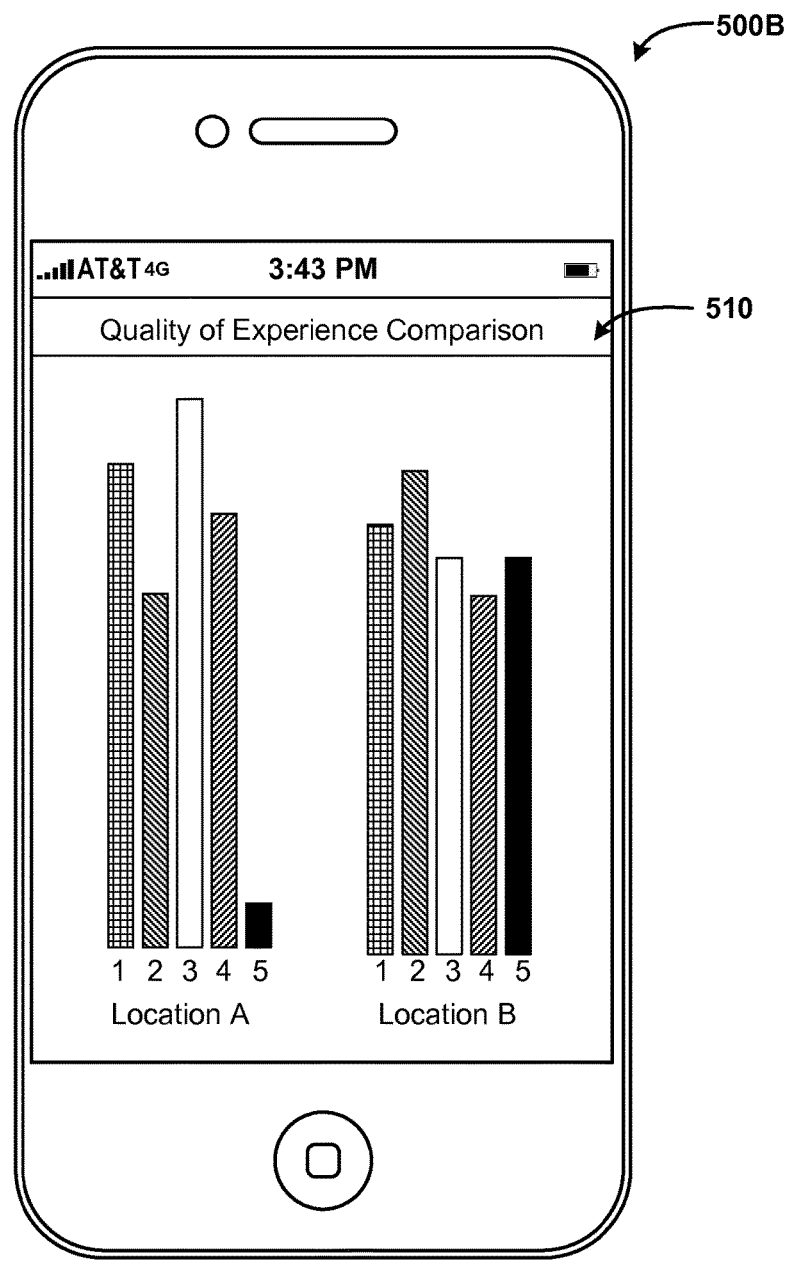

Referring now to FIG. 5B, a UI diagram showing additional aspects of the concepts and technologies disclosed herein for collecting and using quality of experience information are described in detail. In particular, FIG. 5B shows an illustrative screen display 500B generated by a device such as the user device 102. It should be appreciated that the UI diagram illustrated in FIG. 5B is illustrative of one contemplated example of the UIs 112 and therefore should not be construed as being limited in any way.

The screen display 500B can include a quality of experience comparison display 510. The quality of experience comparison display 510 can be used to allow users to compare multiple geographic locations and various quality of experience information associated with those geographic locations. In the illustrated example, the quality of experience comparison display 510 includes quality of experience information associated with two geographic locations, Location A and Location B. Because the quality of experience comparison display 510 can include quality of experience information for two and/or more than two geographic locations, it should be understood that this embodiment is illustrative, and should not be construed as being limiting in any way.

As shown in FIG. 5B, the quality of experience comparison display 510 includes five different quality of experience metrics and relative values of these quality of experience metrics. While bar charts are shown in FIG. 5B, the quality of experience information can be displayed as numerical values, pie charts, color coding, other visual indicators, combinations thereof, or the like. It can be appreciated from the above description of FIGS. 1-4, that the quality of experience metrics can define particularly relevant quality of experience information, and that the relative values can correspond to the quality of experience findings described above. More than five, five, and/or less than five quality of experience metrics can be displayed. As such, the illustrated quality of experience comparison display 510 is illustrative of one example and should not be construed as being limiting in any way.

By glancing at the quality of experience comparison display 510, a user or other entity can determine which of the geographic locations (e.g., Location A and Location B) is associated with a better quality of experience. Based upon the particular quality of experience metrics displayed, the user can decide what quality of experience metric is most important and select a geographic location based upon that determination. In some embodiments, the geographic locations can be within several feet of one another or more than several miles from one another. In case of the former, a user may move to a better location based upon the information included in the quality of experience comparison display 510. As such, some embodiments of the concepts and technologies disclosed herein enable a user to find a location that meets his or her quality of experience needs or desires using the quality of experience display data 114 described herein.

Figure 5C:
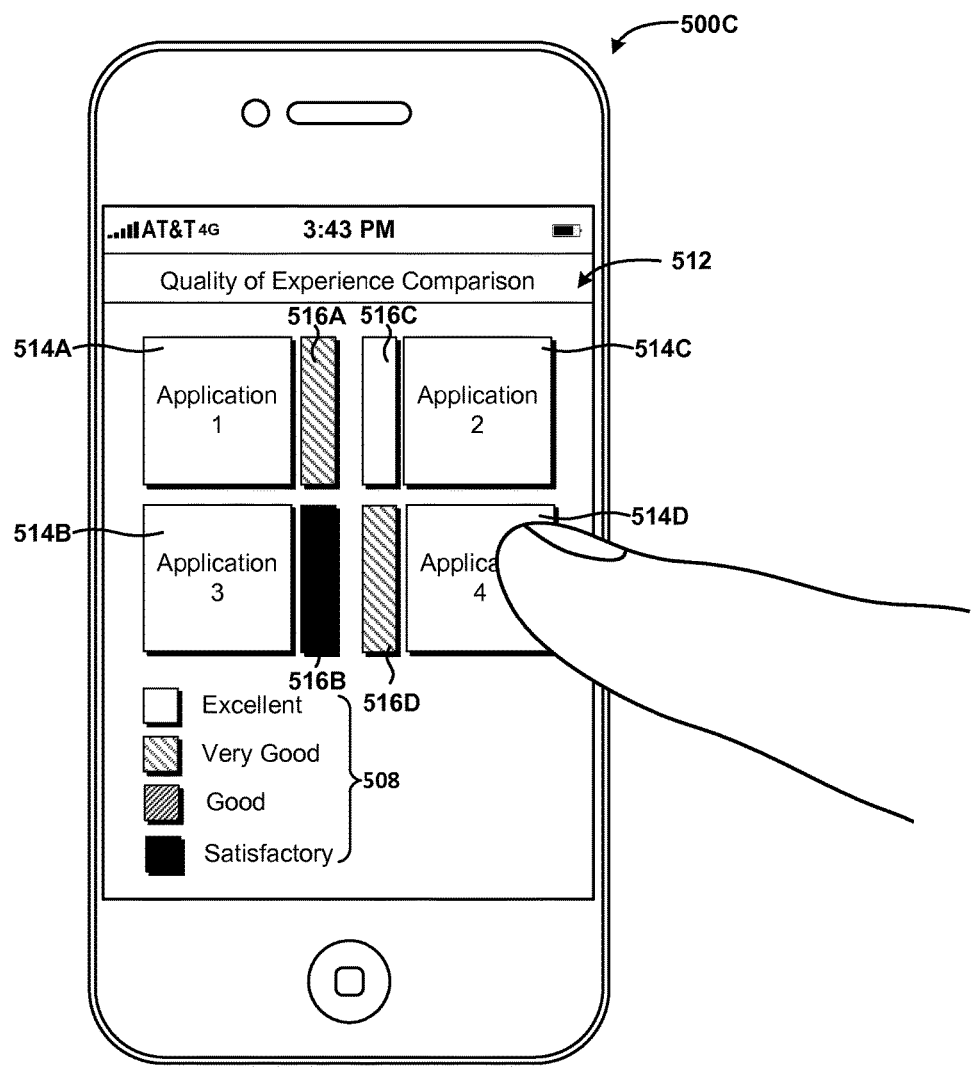

Referring now to FIG. 5C, a UI diagram showing additional aspects of the concepts and technologies disclosed herein for collecting and using quality of experience information are described in detail. In particular, FIG. 5C shows an illustrative screen display 500C generated by a device such as the user device 102. It should be appreciated that the UI diagram illustrated in FIG. 5C is illustrative of one contemplated example of the UIs 112 and therefore should not be construed as being limited in any way.

The screen display 500C can include a quality of experience application icon grid display 512. The quality of experience application icon grid display 512 can be used to allow users to compare a quality of experience metric or metrics associated with each of multiple application programs 108 executing at the user device 102. Thus, the quality of experience application icon grid display 512 can be used to inform a user or other entity of respective quality of experience information associated with each of multiple application programs 108. As explained above, one or more rules can be defined for specifying particular quality of experience metrics relevant to a particular application program 108. As such, quality of experience information for each of multiple application programs 108 may differ at any particular time and/or geographic location. Thus, the quality of experience application icon grid display 512 can be used to quickly determine quality of experience information for each of the application programs 108 represented on the quality of experience application icon grid display 512.

As shown in FIG. 5C, the quality of experience application icon grid display 512 includes four UI controls 514A-D (hereinafter collectively and/or generically referred to as "UI controls 514"). Selection of one or more of the UI controls 514 can cause the user device 102 to activate an application program 108 corresponding to the selected UI controls 514. The quality of experience application icon grid display 512 also includes four quality of experience indicators 516A-D (hereinafter collectively and/or generically referred to as "quality of experience indicators 516"). The quality of experience indicators 516 can provide a color-coded, pattern-coded, alphanumeric, and/or otherwise formatted indication of quality of experience associated with the respective application programs 108 represented by the UI controls 514.

As explained above, the user, a network operator, application program developers, and/or other entities can specify what quality of experience metrics are considered when generating the quality of experience indicators 516. Thus, for example, a user may access a preference screen that lists one or more application programs 108, and various quality of experience metrics such as latency, uplink speed, downlink speed, a degree of burstiness, reliability of a data connection, voice quality, ping response time, WIFI availability, cellular data availability, 2 G/3 G/4 G signal availability, combinations thereof, or the like. One or more of these metrics can be selected, for example using on/off selectors, checkboxes, or the like, for one or more of the application programs 108. As such, a user or other entity can specify what quality of experience metrics are considered in determining quality of experience as described herein. It should be understood that this embodiment is illustrative, and should not be construed as being limiting in any way.

The quality of experience application icon grid display 512 also includes a legend 508 as described above with reference to FIG. 5A. Because quality of experience can be represented without a legend 508 and/or because the quality of experience can be defined by more than four grades as shown in FIG. 5C, it should be understood that the example legend 508 is merely illustrative. It can be appreciated with reference to FIG. 5C that a user or other entity can determine, with a glance at the screen display 500C, a quality of experience associated with each application program 108 represented by one of the UI controls 514 shown in FIG. 5C.

While four UI controls 514 and four quality of experience indicators 516 are shown in FIG. 5C, it should be understood that that less than four, four, and/or more than four UI controls 514A-D can be displayed. Furthermore, because selection of the UI controls 514 can cause the user device 102 to perform additional or alternative actions, the illustrated quality of experience application icon grid display 512 is illustrative of one example and should not be construed as being limiting in any way.

Figure 5D:
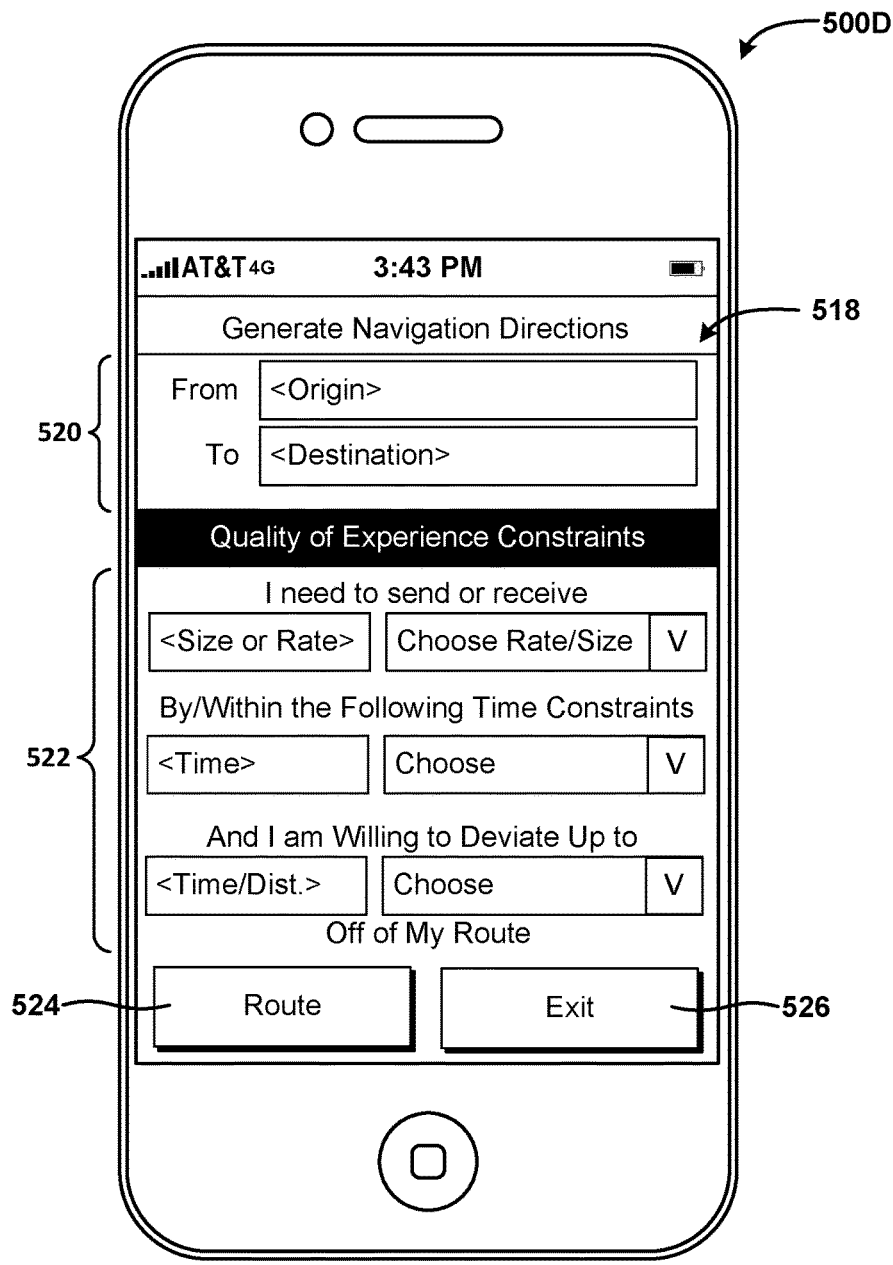

Referring now to FIG. 5D, a UI diagram showing additional aspects of the concepts and technologies disclosed herein for collecting and using quality of experience information are described in detail. In particular, FIG. 5D shows an illustrative screen display 500D generated by a device such as the user device 102. It should be appreciated that the UI diagram illustrated in FIG. 5D is illustrative of one contemplated example of the UIs 112 and therefore should not be construed as being limited in any way.

The screen display 500D can include a quality of experience navigation directions display 518. The quality of experience navigation directions display 518 can be used to allow users to request navigation directions and/or to specify one or more quality of experience constraints associated with the route to be generated. As shown in FIG. 5D, the screen display 500D can include a route information area 520 for specifying an origin and/or destination for a navigation route. Although not shown in FIG. 5D, it should be understood that the route information area 520 can include links to a contact book or other source for addresses or other location information.

The screen display 500D also can include a quality of experience constraints area 522 for specifying quality of experience constraints to apply to the navigation route being requested. As explained herein, particularly with reference to FIG. 4, a user or other entity can specify the quality of experience constraints to allow deviation from the navigation route between the origin and destination to accommodate specific requested data sessions and/or other communications within particular specified time constraints. It should be understood that this embodiment is illustrative, and should not be construed as being limiting in any way.

The screen display 500D also includes a UI control 524 for requesting a route. Selection of the UI control 524 can cause the user device 102 to send the route information and the quality of experience constraints entered via the screen display 500D to the quality of experience management service 118 with a request for navigation directions. The screen display 500D also includes a UI control 526 for exiting the quality of experience navigation directions display 518. Because additional and/or alternative information can be obtained via the screen display 500D, it should be understood that the illustrated example is illustrative and should not be construed as being limiting in any way.

Figure 5E:
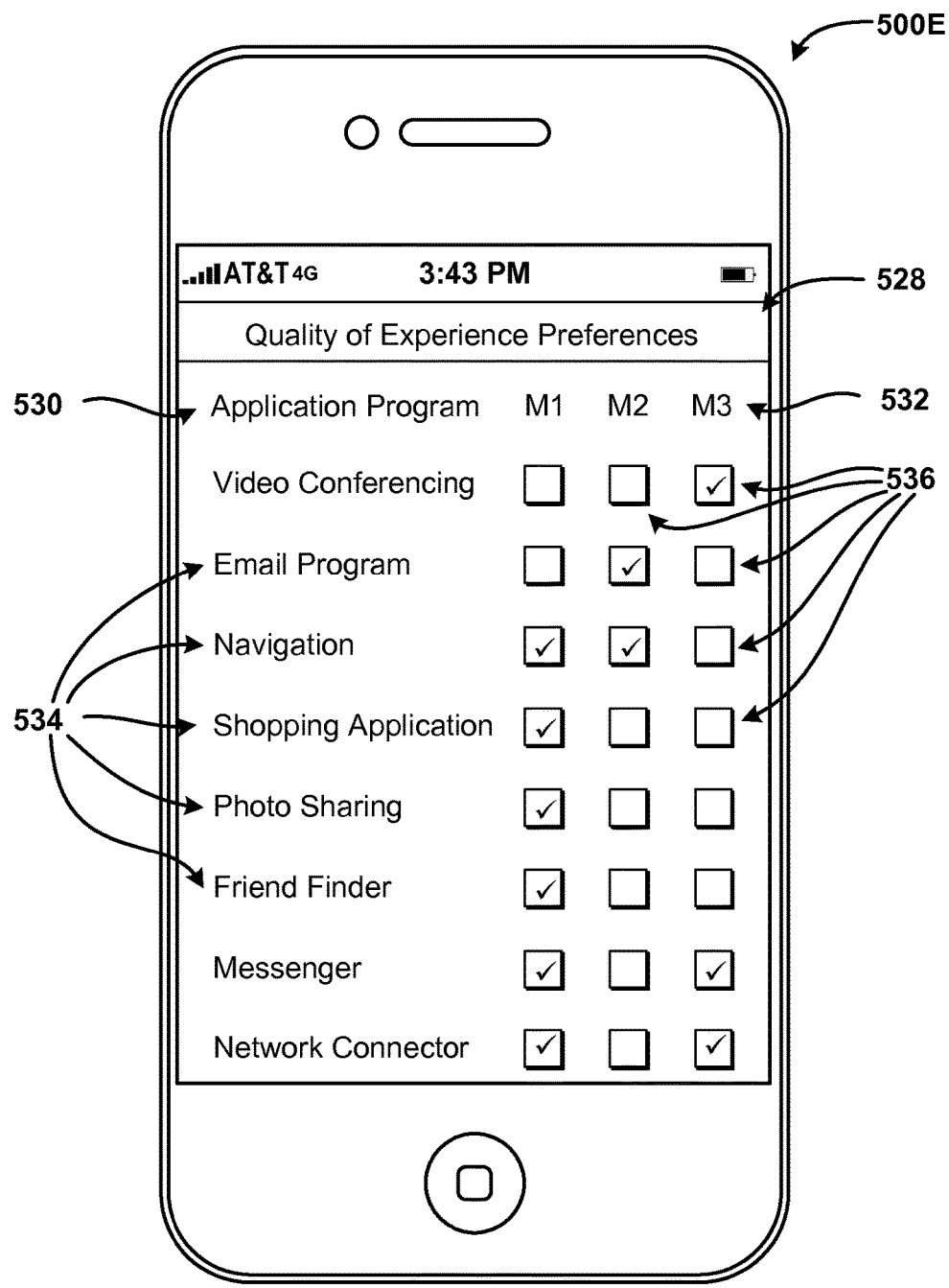

Referring now to FIG. 5E, a UI diagram showing additional aspects of the concepts and technologies disclosed herein for collecting and using quality of experience information are described in detail. In particular, FIG. 5E shows an illustrative screen display 500E generated by a device such as the user device 102. It should be appreciated that the UI diagram illustrated in FIG. 5E is illustrative of one contemplated example of the UIs 112 and therefore should not be construed as being limited in any way.

The screen display 500E can include a quality of experience preferences screen 528. The quality of experience preferences screen 528 can be used to allow users to configure what quality of experience metrics are to be considered when determining a quality of experience associated with one or more application programs 108. Thus, a user may specify, for example, that a quality of experience metric to be considered for an email application is download speed, since the user may determine that a quality of experience associated with downloading emails is more important to the user's notion of quality of experience than an upload speed for sending emails. It should be understood that this embodiment is illustrative, and should not be construed as being limiting in any way.

As shown in FIG. 5E, the screen display 500E can include a table for choosing and/or configuring one or more quality of experience metrics to be considered for various device functionality. In the illustrated embodiment, the quality of experience preferences screen 528 displays an application program heading 530 and metric headings 532. Under the application program heading 530, the quality of experience preferences screen 528 can include indicators 534 for any number of the application programs 108. Because the indicators 534 can include other device functionality not provided by application programs (e.g., metric reporting, location services, or the like), it should be understood that the indicators 534 shown in FIG. 5E are illustrative and should not be construed as being limiting in any way.

The quality of experience preferences screen 528 also can include UI controls 536 under the metric headings 532 for selecting one or more of the quality of experience metrics indicated by the metric headings 532 for one or more of the application programs 108 and/or other device functionality indicated by the indicators 534. While the metric headings 532 are shown as "M1," "M2," and "M3," it should be understood that the metric headings 532 can specify a particular quality of experience metric such as, for example, uplink speed, downlink speed, latency, 2 G, 3 G, 4 G, WIFI, other quality of experience metrics, or the like.

Thus, a user or other entity can select one or more of the UI controls 536 to specify what quality of experience metrics are considered when gauging quality of experience for an associated application program 108 or other functionality associated with the indicators 534. Of course, any number of quality of experience metrics and/or indicators 534 can be shown on a screen display such as the screen display 500E. As such, the illustrated embodiment is illustrative and should not be construed as being limiting in any way. It therefore can be appreciated that when quality of experience for an application program 108 or other functionality is described herein, that a user or other entity can specify what quality of experience metrics are considered. It further can be understood that the preferences set via the screen display 500E can be transmitted to the quality of experience management service 118 and saved as the rules and/or other data in the data 122, if desired.

Figure 6:
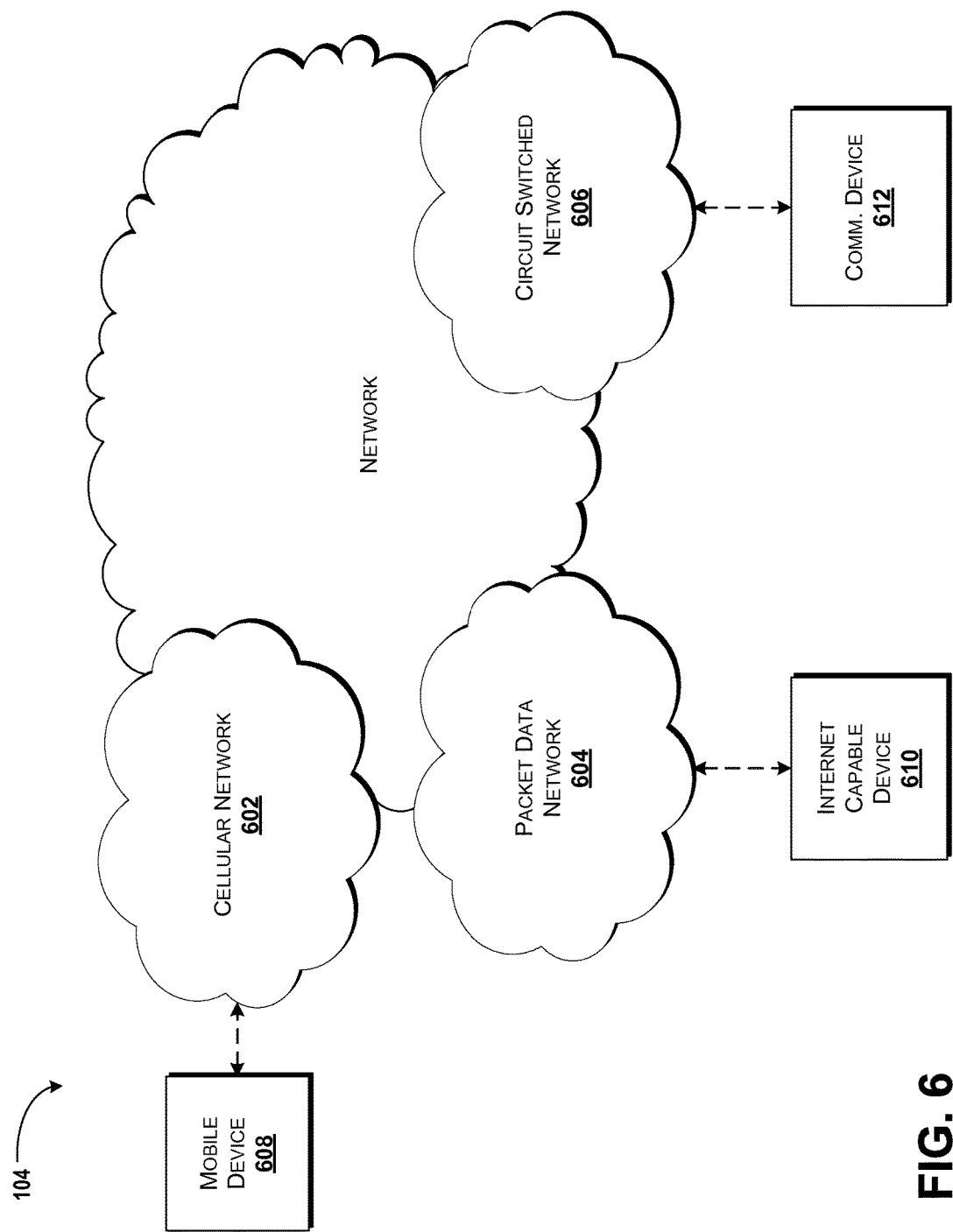
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2 G GSM network and can provide data communications via GPRS and/or EDGE. Additionally, or alternatively, the cellular network 602 can be configured as a 3 G UMTS network and can provide data communications via the HSPA protocol family, for example, HSDPA, EUL (also referred to as HSUPA), and HSPA+. The cellular network 602 also is compatible with 4 G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
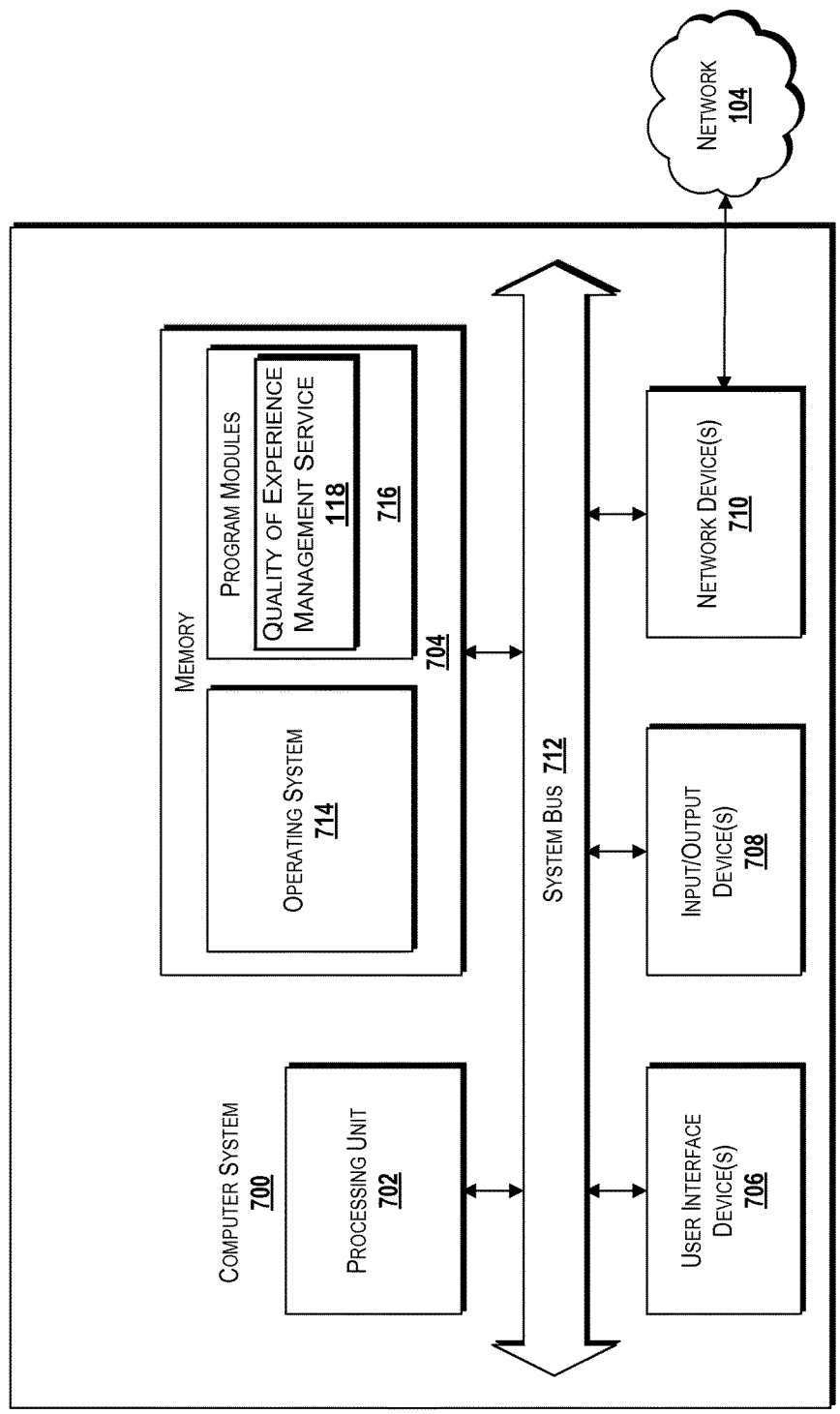
FIG. 7 is a block diagram illustrating an example computer system configured to collecting and using quality of experience information, according to some illustrative embodiments.

FIG. 7 is a block diagram illustrating a computer system 700 configured to provide the functionality described herein for collecting and using quality of experience information, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the quality of experience management service 118. This and/or other programs can be embodied in computer-readable media containing instructions that, when executed by the processing unit 702, perform one or more of the methods 300, 400 described in detail above with respect to FIGS. 3-4. According to embodiments, the program modules 716 may be embodied in hardware, software, firmware, or any combination thereof. Although not shown in FIG. 7, it should be understood that the memory 704 also can be configured to store the device data 116, the data 122, the quality of experience display data 114, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
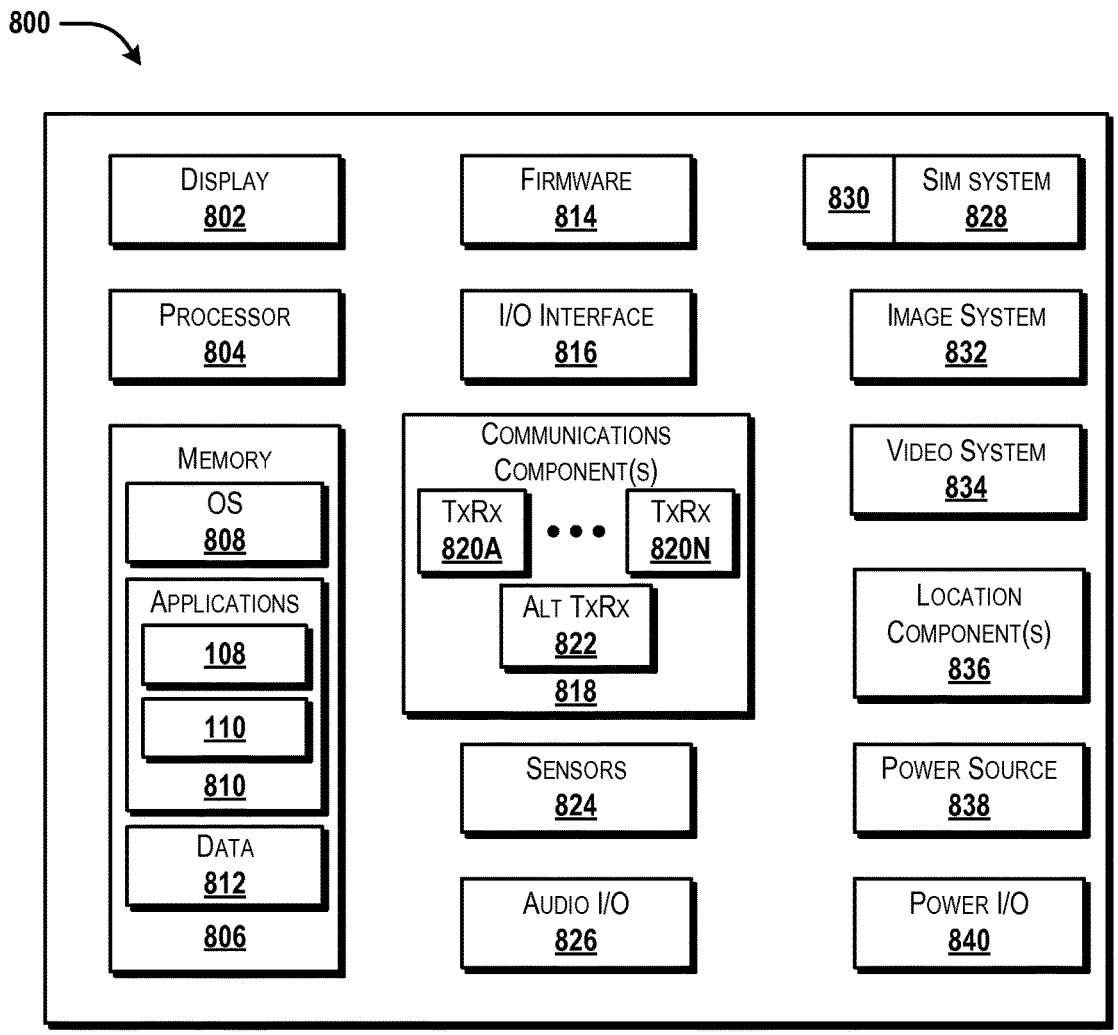
FIG. 8 is a block diagram illustrating an example mobile device configured to interact with a quality of experience management service, according to some illustrative embodiments.

Turning now to FIG. 8, an illustrative mobile device 800 and components thereof will be described. In some embodiments, the user device 102 described above with reference to FIGS. 1-7 can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device("memory") 806. The processor 804 can be configured to process data and/or can execute computer-executable instructions stored in the memory 806. The computer-executable instructions executed by the processor 804 can include, for example, an operating system 808, one or more applications 810 such as the application programs 108 (not shown in FIG. 8), the quality of experience management application 110, and/or other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, scanning or capturing asset ID or asset tag information, creating new asset tags or asset ID numbers, viewing asset information and/or account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, asset information, asset tags and/or asset identifiers, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, asset information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2 G, 2.5 G, 3 G, 4 G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for collecting and using quality of experience information have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   receiving, at a server computer that executes a quality of experience management service, a request for quality of experience display data, the request being received from a user device;
   obtaining, by the server computer and in response to receiving the request, location data that defines a geographic location associated with the user device;
   analyzing, by the server computer, quality of experience information that defines a quality of experience of an application program associated with the user device, the quality of experience of the application program comprising a latency of a data connection of the user device at the geographic location and a speed associated with the data connection, wherein the data connection is used by the application program;
   generating, by the server computer, the quality of experience display data based upon the quality of experience information; and
   providing the quality of experience display data to the user device.

2. The method of claim 1, wherein obtaining the location data comprises obtaining device data from the user device, the device data comprising the location data and device quality of experience information collected by the user device.

3. The method of claim 1, wherein the quality of experience information is collected by a network device in communication with the server computer, and wherein the quality of experience information comprises a rule that defines a metric and information identifying the application program.

4. The method of claim 1, wherein receiving the request comprises receiving a request for navigation directions.

5. The method of claim 4, wherein obtaining the location data comprises obtaining, from the user device, device data comprising the location data, route information, and a quality of experience constraint to be considered during determination of a navigation route represented by the navigation directions.

6. The method of claim 5, wherein the quality of experience constraint comprises data that specifies a time constraint that defines, in time, a deviation from the navigation route to accommodate a requested data rate for a data session and a requested latency for the data session.

7. The method of claim 5, wherein the quality of experience constraint comprises data that defines, in distance, a deviation from the navigation route to accommodate a requested data rate for a data session and a requested latency for the data session.

8. The method of claim 1, wherein providing the quality of experience display data to the user device comprises providing the quality of experience display data comprising data for an application icon display screen to be presented at the user device, wherein the application icon display screen comprises
   a user interface control that corresponds to the application program, and
   a quality of experience indicator that indicates the quality of experience of the application program.

9. The method of claim 1, wherein providing the quality of experience display data further comprises providing instructions to the user device to move data communications occurring via a cellular data connection to a wireless local area network data connection.

10. The method of claim 1, wherein generating the quality of experience display data comprises generating a table of data, and wherein the table of data represents geographic locations, application programs, types of quality of experience data, and values for the quality of experience data.

11. A system comprising:
    a processor; and
    a memory storing computer-executable instructions that, when executed by the processor, cause the processor to perform operations comprising
      receiving, from a user device, a request for quality of experience display data,
      obtaining, in response to receiving the request, location data that defines a geographic location associated with the user device,
      analyzing quality of experience information that defines a quality of experience of an application program executed by the user device, the quality of experience of the application program comprising a latency of a data connection of the user device at the geographic location and a speed associated with the data connection, wherein the data connection is used by the application program,
      generating the quality of experience display data based upon the quality of experience information, and
      providing the quality of experience display data to the user device.

12. The system of claim 11, wherein obtaining the location data comprises obtaining device data from the user device, the device data comprising the location data and device quality of experience information collected by the user device.

13. The system of claim 12, wherein analyzing the quality of experience information comprises analyzing the device data, a quality of experience rule, and quality of experience data obtained by a network device, wherein the quality of experience information comprises a rule that defines a metric and information identifying the application program.

14. The system of claim 11, wherein receiving the request comprises receiving a request for navigation directions, and wherein obtaining the location data comprises obtaining, from the user device, device data comprising the location data, route information, and a quality of experience constraint to be considered during determination of a navigation route represented by the navigation directions.

15. The system of claim 14, wherein generating the quality of experience display data comprises generating the navigation route, and wherein providing the quality of experience display data to the user device comprises providing the navigation directions to the user device.

16. The system of claim 11, wherein generating the quality of experience display data comprises generating data for an application icon display screen to be presented at the user device, wherein the application icon display screen comprises
    a user interface control that corresponds to the application program, and
    a quality of experience indicator that indicates the quality of experience of the application program.

17. A computer storage medium having computer-executable instructions stored thereon that, when executed by a processor, cause the processor to perform operations comprising:
    receiving, from a user device, a request for quality of experience display data;

obtaining, in response to receiving the request, location data that defines a geographic location of the user device;

analyzing quality of experience information that defines a quality of experience of an application program executed by the user device, the quality of experience of the application program comprising a latency of a data connection of the user device at the geographic location and a speed associated with the data connection, wherein the data connection is used by the application program;

generating the quality of experience display data based upon the quality of experience information; and providing the quality of experience display data to the user device.

18. The computer storage medium of claim 17, wherein receiving the request comprises receiving a request for navigation directions, and wherein obtaining the location data comprises obtaining, from the user device, device data comprising the location data, route information, and a quality of experience constraint to be considered during determination of a navigation route represented by the navigation directions.

19. The computer storage medium of claim 18, wherein generating the quality of experience display data comprises generating the navigation route, and wherein providing the quality of experience display data to the user device comprises providing the navigation directions to the user device.

20. The computer storage medium of claim 17, wherein obtaining the location data comprises obtaining device data from the user device, the device data comprising the location data and device quality of experience information collected by the user device, wherein analyzing the quality of experience information comprises analyzing the device data, a quality of experience rule, and quality of experience data obtained by a network device, and wherein the quality of experience information comprises a rule that defines a metric and information that identifies the application program.

* * * * *